(No Model.)

A. L. BROCK.
DISK CULTIVATOR.

No. 570,660. Patented Nov. 3, 1896.

Witnesses.
J. F. Coleman
K. A. Nau

Inventor
Andrew L. Brock
By John Wedderburn
his Atty.

THE NORRIS PETERS CO., PHOTO-LITHO., WASHINGTON, D. C.

UNITED STATES PATENT OFFICE.

ANDREW L. BROCK, OF LOCKHART, TEXAS.

DISK CULTIVATOR.

SPECIFICATION forming part of Letters Patent No. 570,660, dated November 3, 1896.

Application filed May 22, 1896. Serial No. 592,620. (No model.)

*To all whom it may concern:*

Be it known that I, ANDREW L. BROCK, a citizen of the United States, residing at Lockhart, in the county of Caldwell and State of Texas, have invented certain new and useful Improvements in Disk Cultivators; and I do hereby declare the following to be a full, clear, and exact description of the invention, such as will enable others skilled in the art to which it appertains to make and use the same.

My invention relates to disk cultivators, the same being designed as an improvement upon the device patented to me October 2, 1894, No. 526,962.

The invention consists of an improved construction whereby the disks are supported at any point on the under side of the disk-frame and in means whereby the disk-supporting frame may be elevated from the ground.

It also consists in other details of construction, combinations of parts, and arrangements of instrumentalities, which will be hereinafter more fully described and claimed.

Figure 1:
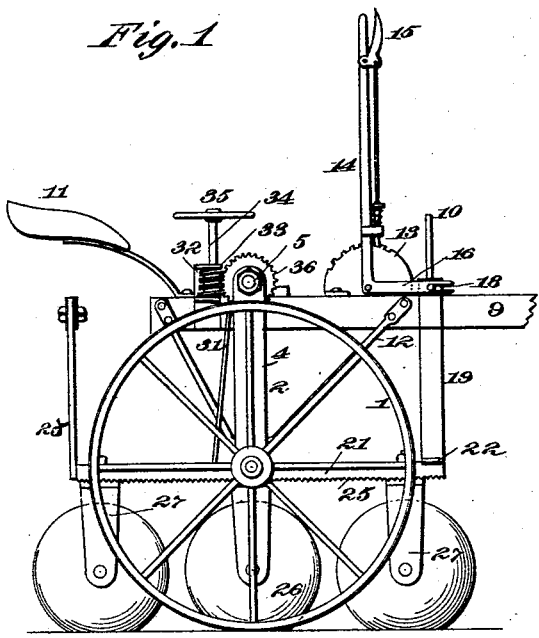
Figure 2:
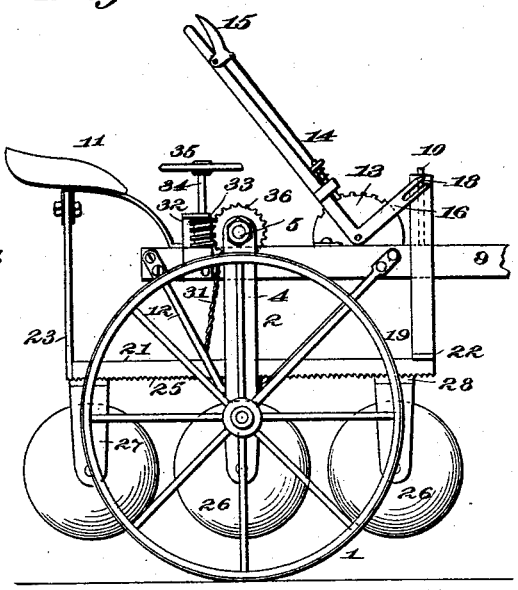
Figure 3:
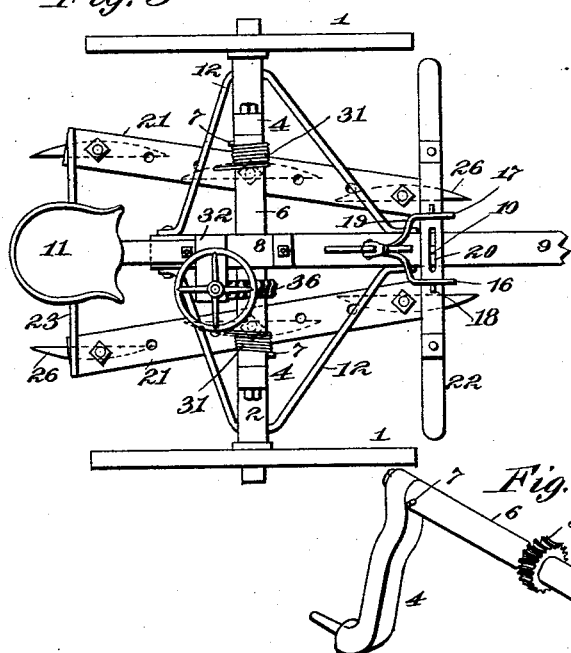
Figure 4:
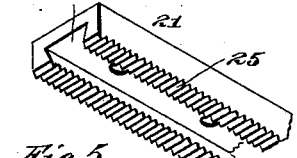
Figure 5:
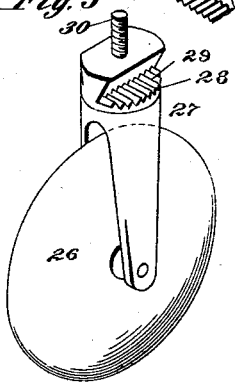
Figure 6:
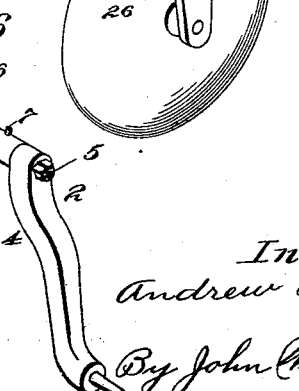

In the drawings forming part of this specification, Figure 1 represents a side elevation of my cultivator with the disks thereof shown in operative position. Fig. 2 is a similar view of the same with the disks in their elevated position. Fig. 3 is a plan view. Fig. 4 is a detail view in perspective showing the dovetailed grooves and corrugations on the under side of one of the bars constituting the disk-supporting frame. Fig. 5 is a similar view of one of the disks, showing the peculiar construction of the upper end of the bracket in which the disk is mounted, whereby an adjustable connection is made between said disk and the supporting-frame thereof. Fig. 6 is a detail perspective view of the crank-shaft upon which the wheels of my cultivator are mounted.

Like reference-numerals indicate like parts in the different views.

My invention has been illustrated as mounted upon wheels 1 1, and this is the form in which I prefer to use my improved cultivator, but it is obvious that the wheels may be dispensed with should I so desire. The wheels 1 are mounted upon spindles on the main shaft 2, which is formed with a yoked shaft extension in its center, as clearly shown. This shaft may be made in three parts, if desired, the said parts consisting of two supporting-arms 4 4, which are connected by a horizontal shaft 5. Fitting around the shaft 5 is a sleeve 6, provided with projections 7 7 thereon for a purpose which will hereinafter appear. Fitting loosely around the sleeve 6 on the shaft 5 is a collar 8, connected to the rear end of a pole 9, which extends to the forward part of the machine and has projecting upwardly from a point near its middle a pin 10. It has also secured to its rear end a seat 11, and is further connected by means of curved rods or bars 12 with the side pieces 4 4. The said pole also has secured to it a sector 13, to which is pivoted a lever 14, having a spring-operated hand-lever 15 connected thereto, which is adapted to engage the teeth of the sector 13 to adjust the lever 14 at any desired position. Said lever 14 is formed with right-angled extensions 16, which are yoked at their outer ends, as shown at 17, and support, through a transverse pin or shaft 18, the forward end of the disk-supporting frame 19.

A slot 20 is provided in the supporting-frame 19 at a point between the two arms 16 of the lever 14, and through this slot projects the pin 10 on the pole 9. This supporting-frame 19 is made up of the supporting-beams 21 21, connected at their front and rear ends by suitable yoked brace-rods 22 23 and formed with dovetailed grooves 24 on their under surfaces. The said bars are further provided with transverse corrugations 25 on their under surfaces for a purpose which will hereinafter appear.

26 26 represent cultivating-disks which are suitably mounted in brackets 27, having plates 28 upon their upper ends, which plates are dovetailed, as shown, and formed with corrugations 29, extending laterally thereof. The dovetailed portions of the plates 28 fit the dovetailed grooves 24 in the bars 21 and support the harrow-disks. The said disks are adjusted to any point along the length of the bars 21 by means of bolts 30, passing through the corrugations 29 and 25. Cords or belts 31 31 connect the rear end of the disk-supporting frame 19 with the projections 7 on the sleeve 6. Rotatably mounted in a bracket 32 at a point near the rear end of the pole 8 is a worm 33, having a shaft 34 projecting upwardly therefrom with an operating-wheel 35 thereon. This worm 33 engages a worm gear-wheel 36 on the sleeve 6.

From the foregoing description, taken in connection with the accompanying drawings, it will be seen that I have provided means whereby the cultivating-disks may be adjusted independently at any point along the under side of the disk-supporting frame, and, furthermore, that novel means have been provided for raising and lowering the disk-supporting frame in contact with the ground. In case it is desired to elevate the forward end of the frame 19 it is merely necessary to press the spring-actuated lever 15 so that its lower end will be removed from the teeth of the sector 13 and withdraw the lever 14, which, through the medium of the right-angled extensions or arms 16 thereon, will raise the forward end of the frame 19. The rear end of the frame 19 may be readily and conveniently elevated by turning the operating-wheel 35, which, through the medium of the worm 33 and worm gear-wheel 36, will turn the sleeve 6 and wind the cord 31, connected to the projections 7, around said sleeve.

Having now described my invention, what I claim as new, and desire to secure by Letters Patent, is—

In a disk cultivator, the combination with the framework mounted upon suitable wheels, of a pole pivotally mounted therein, a sector secured to the upper side of said pole, a lever fulcrumed in said sector having right-angled extensions thereto, a disk-supporting frame loosely connected to the ends of said extensions, a worm mounted in a bracket secured to the rear ends of said pole, a worm gear-wheel meshing therewith, a sleeve mounted upon a suitable shaft to which said gear-wheel is connected, projections on said sleeve and cords connecting said projections and the rear end of said disk-supporting frame, substantially as and for the purpose described.

In testimony whereof I have signed this specification in the presence of two subscribing witnesses.

ANDREW L. BROCK.

Witnesses:
W. W. CARPENTER,
A. P. WILLIAMS.